United States Patent [19]

Nottle

[11] Patent Number: 5,360,380
[45] Date of Patent: Nov. 1, 1994

[54] VARIABLE RATIO EPICYCLIC TRANSMISSION

[76] Inventor: Murray K. Nottle, 1 kerferd Road, Glen Iris, Victoria 3146, Australia

[21] Appl. No.: 66,003

[22] PCT Filed: Nov. 22, 1991

[86] PCT No.: PCT/AU91/00538
§ 371 Date: Aug. 17, 1993
§ 102(e) Date: Aug. 17, 1993

[87] PCT Pub. No.: WO92/09828
PCT Pub. Date: Jun. 11, 1992

[30] Foreign Application Priority Data

Nov. 23, 1990 [AU] Australia ............... PK3499
Jul. 5, 1991 [AU] Australia ............... PK7065

[51] Int. Cl.⁵ ............. F16H 3/58; F16H 3/76
[52] U.S. Cl. .................. 475/182; 475/331; 475/169
[58] Field of Search .............. 475/182, 331, 169

[56] References Cited

U.S. PATENT DOCUMENTS

| | | | |
|---|---|---|---|
| 3,675,509 | 7/1972 | Widdershoven | 475/182 |
| 3,949,619 | 4/1976 | Kuehl | 475/182 |
| 4,567,789 | 2/1986 | Wilkes | 475/182 |
| 5,033,995 | 7/1991 | Salesse | 475/182 |
| 5,074,829 | 12/1991 | Menge, Sr. | 475/182 |

Primary Examiner—Edward K. Look
Assistant Examiner—Michael S. Lee
Attorney, Agent, or Firm—James Ray & Associates

[57] ABSTRACT

A variable ratio epicyclic drive transmission comprises a drive shaft (10), a driven shaft (11), a sun wheel (12) fixed on the driven shaft (11), a stationary outer ring member co-axial with said shafts, a planet carrier (15) fixed to the drive shaft (10) and three planet wheels (19) swing mounted on said carrier and in engagement with said ring member. The ring member comprises an almost complete, but broken, substantially circular loop of chain (14) engaged by said planet wheels (19) and supported by a contractile iris structure permitting the diameter of the loop to be varied while maintaining its circularity.

8 Claims, 5 Drawing Sheets

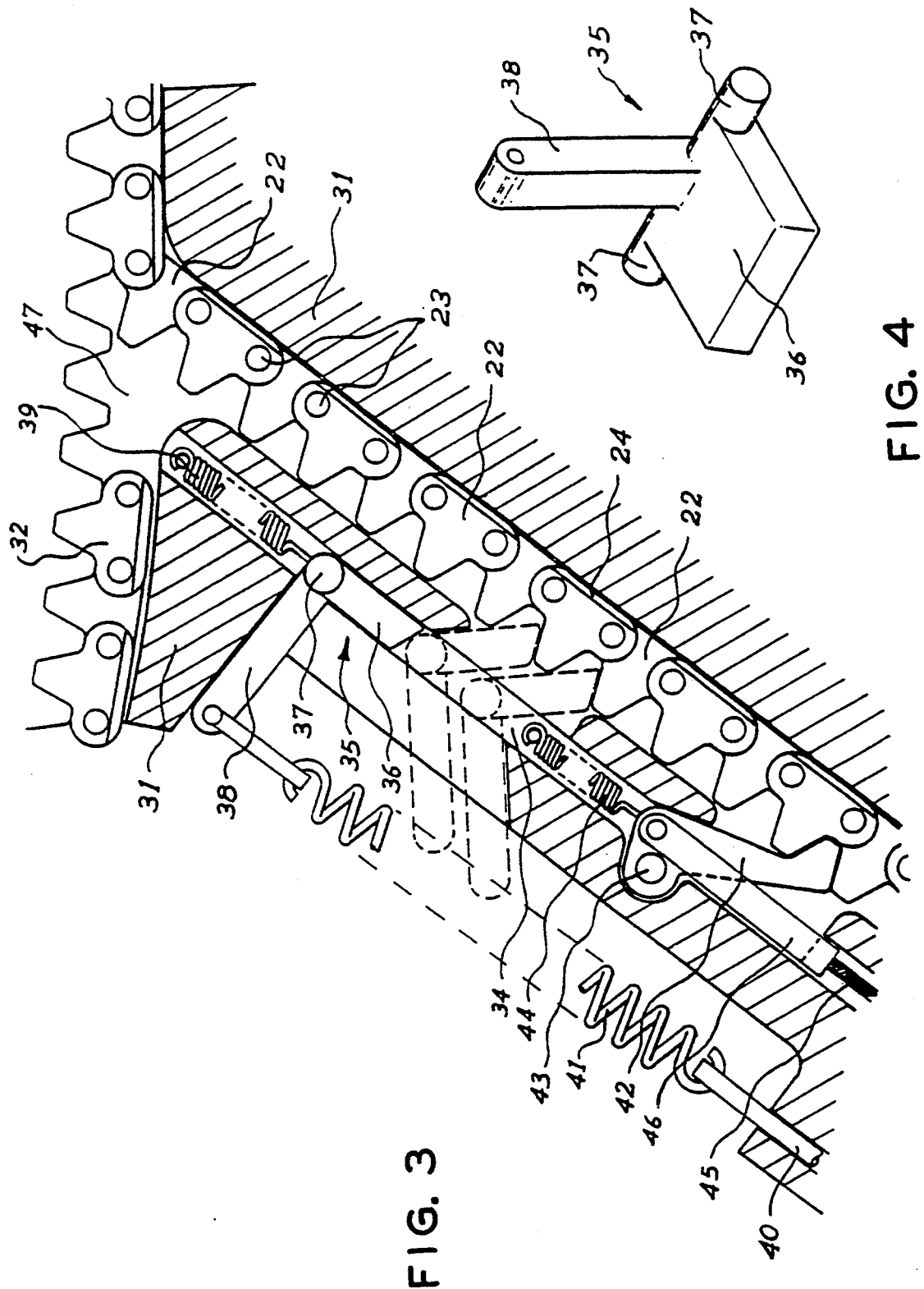

VARIABLE RATIO EPICYCLIC TRANSMISSION

TECHNICAL FIELD

This invention relates to epicyclic drive transmissions or gear boxes of the kind having a fixed central axis and comprising a rotatable driving element with said fixed axis as its axis of rotation, a rotatable driven element also with said fixed axis as its axis of rotation, a central sun wheel fixed relative to one of said elements so as to rotate in concert with said one element also with said fixed axis as its axis of rotation, a stationary outer ring member co-axial with said elements, a planet carrier fixed relative to the other of said elements so as to rotate in concert with said other element with said fixed axis as its axis of rotation and defining an orbiting axis of rotation parallel to and radially spaced from said fixed axis, and at least one planet wheel mounted on said carrier for rotation about, and orbital movement with, said orbiting axis; said planet wheel being simultaneously engaged with said sun wheel and said ring member.

BACKGROUND ART

Such transmissions are usually reversible and the driving element may become the driven element and vice versa depending on the external circumstances, but for descriptive convenience it is assumed hereinafter that the element fixed to the planet carrier is the driving element.

Briefly stated, such transmissions operate as follows. The driving element is rotated by an external power source and it causes the planet carrier to rotate about the transmission's stationary axis. The planet carrier therefore causes the planet wheel to orbit with the orbiting axis, that is to say causes the planet wheel to roll around the stationary ring member, which causes the planet wheel to rotate about its own (the orbiting) axis. The planet wheel is engaged with the sun wheel and therefore the rotation of the planet wheel causes the sun wheel to rotate to a greater or lesser extent, depending on the extent to which the orbital movement of the planet wheel about the sun wheel augments or diminishes the effect of its rotation on that wheel. The rotation of the sun wheel induced by the combined effect on it of the orbital movement and rotation of the planet wheel is transmitted to the driven element.

The velocity ratio of such a transmission is determined by the relative values of the diameters of the ring member, planet wheel and sun wheel. Thus if the diameters of the planet wheel and sun wheel are left unchanged, the velocity ratio could be varied by altering the diameter of the ring member. Indeed proposals to provide variable ratio epicyclic or similar transmissions wherein the ring member is of variable diameter have been put forward hitherto. One such is the transmission described and illustrated in the International patent application PCT/AU/89/00241 published under publication No. WO 89/12185.

DISCLOSURE OF INVENTION

There are two design problems inherent in such variable ratio transmissions, namely
(i) arranging for the variation of the diameter of the ring member, and
(ii) maintaining effective engagement of the planet wheel with the ring member and sun wheel as the ring member's diameter is varied.

In common with many other variable ratio drive transmissions, for example non-epicyclic variable ratio drives, the transmission of the above mentioned International application overcomes design problem (i) above by utilising frictional contact between the ring member and that proposal's equivalent of a planet wheel, for the transmission of torque therebetween. It is relatively easy to vary the effective geometry of the ring member while maintaining a simple rolling contact with another component, but the problem is much more intractable if a more positive, meshing gear type engagement is required, so as to retain the greater torque transfer capability of such by comparison with that available from mere frictional contact. That prior art proposal meets (ii) above by a complex arrangement of nested eccentrics.

Therefore an object of the present invention is to provide a simple, efficient, variable ratio, epicyclic drive transmission providing a positive drive between the driving and driven elements.

In meeting that object the invention addresses problem (i) above by providing a ring member comprising an almost complete, but broken, loop of a pliable positive drive tensile member, for example a chain presenting either pins or rollers for engagement with a sprocket or teeth for engagement with a a gear wheel, or a belt presenting ribs for engagement with a complementarily ribbed roller, supported by a contractile iris structure permitting the diameter of the loop to be varied while maintaining its substantial circularity, in combination with joint means comprising a tail guide defining a passage extending out of the loop at one end of the break therein, through which surplus tensile member may be expelled from the loop or taken back into the loop, and bridging means maintaining continuity of engagement between the ring member and the planet wheel as it crosses the break in the loop. For preference the joint means include escapement means permitting the tensile member to be withdrawn from or fed into the loop only in increments equal to one or more pitch distances of the drive formations therein, that is to say the formations which provide for positive engagement with a planet wheel.

The invention addresses problem (ii) by swing mounting the planet wheels on the planet carrier and providing orbiting transfer transmission means mounted on the planet carrier interconnecting the planet wheels and the sun wheel. In preferred embodiments the planet carrier assembly comprises a core fixed to the driven element, a rotatable transfer shaft mounted on said core with its axis coinciding with the orbiting axis, two swinging radius arms mounted on said transfer shaft, loading means resiliently urging said radius arms from a more nearly tangential to a more nearly radial alignment, a rotatable planet wheel shaft carrying the planet wheel fixedly thereon and extending from one radius arm to the other so as to be parallel to the orbiting axis and spaced therefrom (axis to axis) by a predetermined distance, a slave wheel fixedly mounted on the transfer shaft and engaged with the sun wheel, and two mutually engaged transfer wheels, one fixed on the planet wheel shaft and the other fixed on the transfer shaft; said predetermined distance being equal to the sum of the radii of the two transfer wheels.

The arrangement is such that the planet wheel may maintain engagement with the loop as the latter contracts or expands by virtue of swing movement of the radius arms. Thus the planet wheel rotates about its own axis due its rolling movement around the ring member exactly as it would if it were conventionally mounted directly on the orbiting axis of an appropriately sized planet carrion and that rotation is transmitted by the transfer wheels to the slave wheel. Furthermore the slave wheel orbits directly with the transfer shaft (which, it will be remembered coincides with the "true" orbiting axis) so that the combined orbital motion and rotation of the slave wheel corresponds to (and if the planet wheel, transfer wheels and slave wheel are all of the same size, replicates exactly) those of a normal planet wheel mounted on the carrier orbiting axis and directly engaged with both the ring member and the sun wheel.

Therefore the invention consists in a variable ratio epicyclic drive transmission, of the kind having a fixed central axis and comprising a rotatable driving element with said fixed axis as its axis of rotation, a rotatable driven element also with said fixed axis as its axis of rotation, a central sun wheel fixed relative to one of said elements so as to rotate in concert with said one element also with said fixed axis as its axis of rotation, a stationary outer ring member co-axial with said elements, a planet carrier fixed relative to the other of said elements so as to rotate in concert with said other element with said fixed axis as its axis of rotation and defining an orbiting axis of rotation parallel to and radially spaced from said fixed axis, and at least one planet wheel mounted on said carrier for rotation about its own axis and for orbital movement in engagement with said ring member, said transmission being characterised;

in that the ring member comprises an almost complete, but broken, substantially circular loop of a pliable positive drive tensile member engagable by said planet wheel and supported by a contractile iris structure permitting the diameter of the loop to be varied while maintaining its circularity;

in that said iris structure includes joint means comprising a tail guide defining a passage extending out of the loop at one end of the break therein, through which tensile member may be drawn from the loop or taken back into the loop, and bridging means maintaining continuity of engagement between the ring member and the planet wheel as it traverses the break in the loop;

in that the planet wheel is swing mounted on the planet carrier;

and in that orbiting drive transfer means mounted on the planet carrier connect the planet wheel to the sun wheel.

BRIEF DESCRIPTION OF THE DRAWINGS

By way of example, preferred embodiments of the above described invention are described in more detail hereinafter with reference to the accompanying drawings.

FIG. 3 is a fragmentary sectional view of joint means taken on line 3—3 of FIG. 2, drawn to a larger scale.

FIG. 4 is perspective view of a pusher element, being a component of the joint means of FIG. 3.

BEST MODE OF CARRYING OUT THE INVENTION

Figure 1:
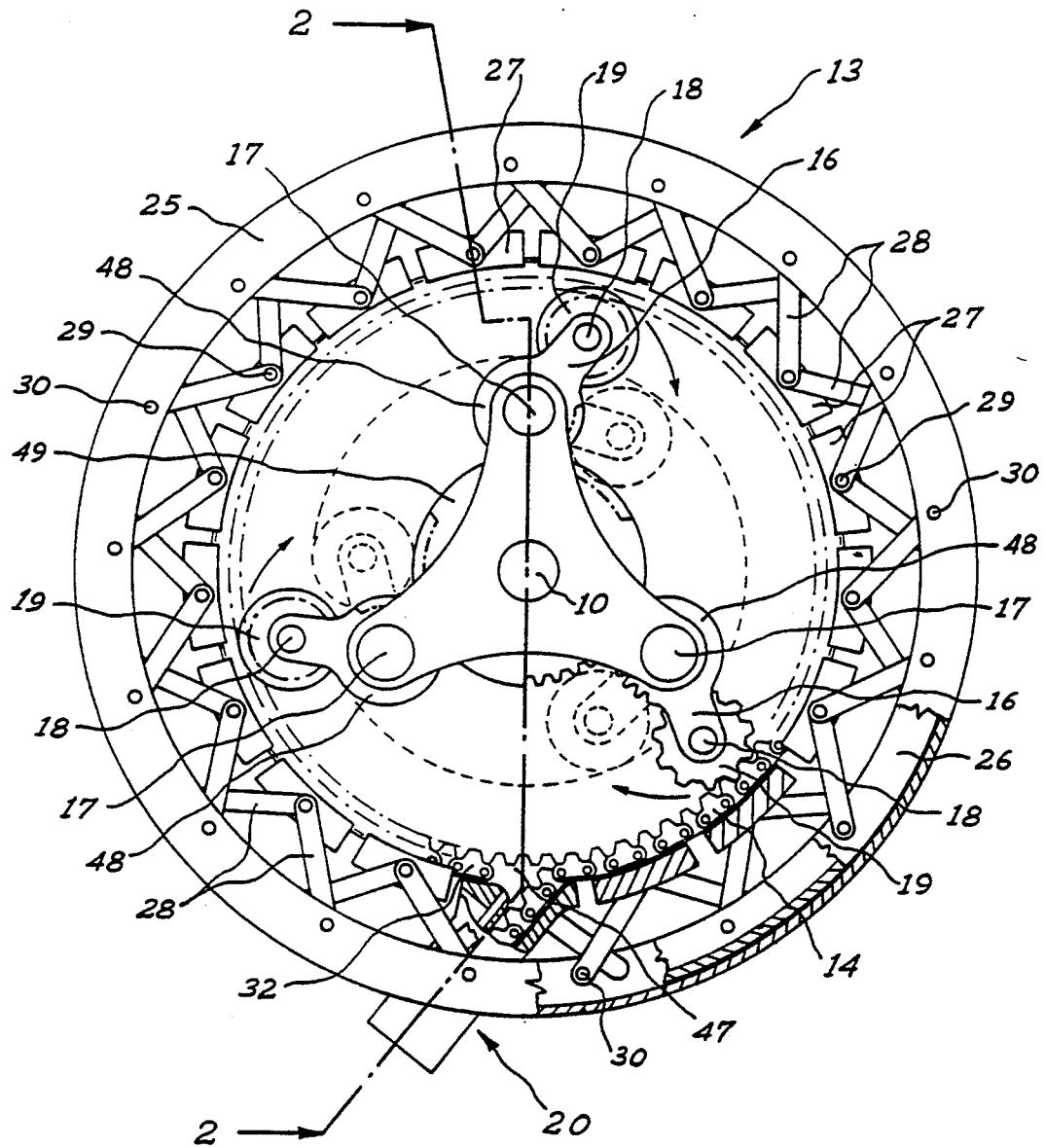
FIG. 1 is an end elevation of an assembly of the main internal components of a gear box according to the invention.
Figure 2:
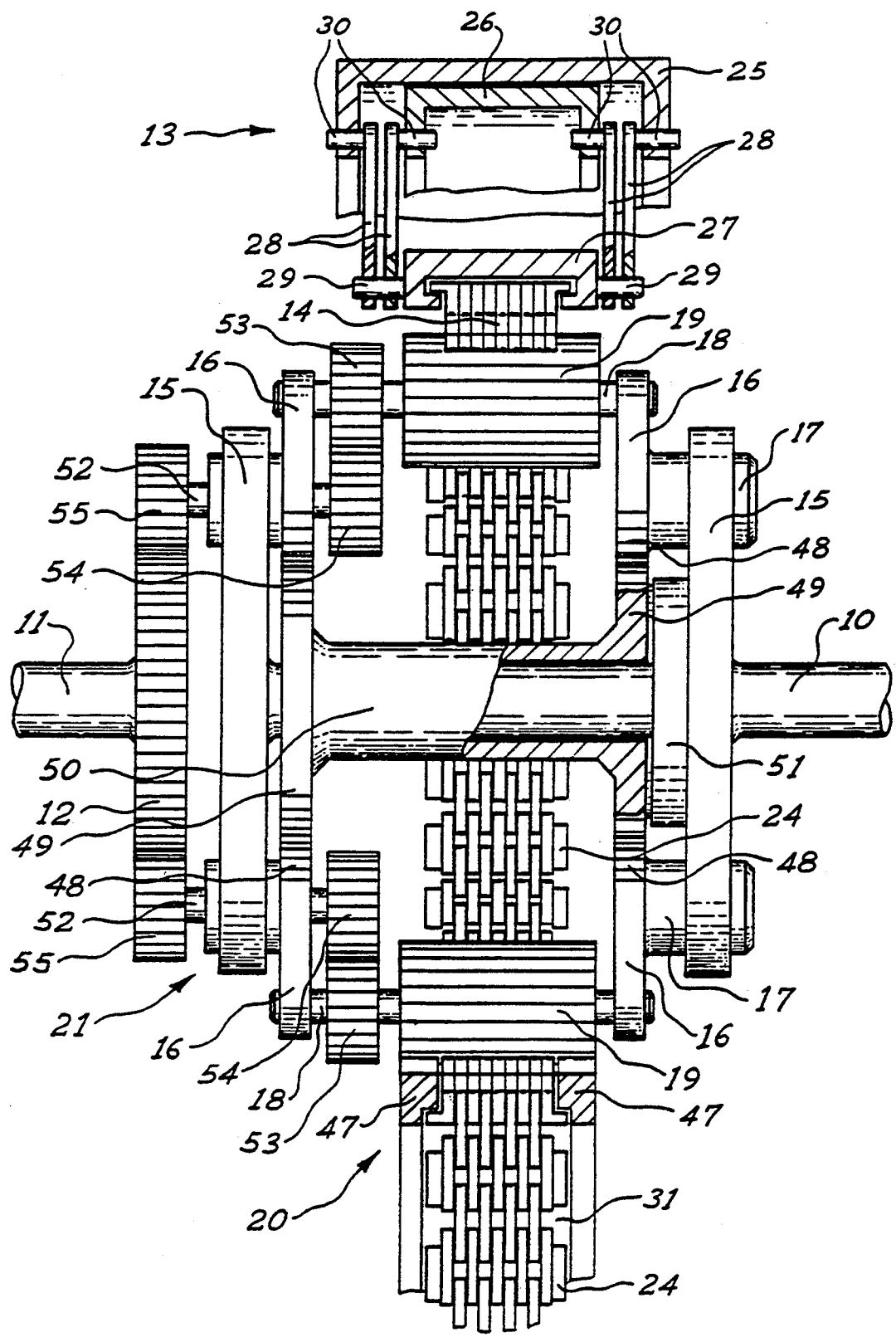
FIG. 2 is side elevation of the assembly of FIG. 1 partly sectioned as on line 2—2 in that figure.

In the illustrated embodiments, as in other preferred embodiments of the invention, there are a plurality of equiangularly spaced apart planet wheels, each with its associated components (swing arms, slave wheel etc.). The preferred number of such planet wheels is three, as is shown in FIG. 1, but for clarity of illustration FIG. 2 is drawn as if two of those three wheels were diametrically opposed. Alternatively FIG. 2 may be regarded as a different embodiment having two or four planet wheels.

The assembly illustrated by FIGS. 1 and 2 is enclosed in a case (not shown). As is well known the case is the means whereby the transmission is supported in a vehicle or other apparatus and itself supports the assembly of internal components. In the present instance the case would include bearings and oil seals for a driving shaft 10 extending either directly or indirectly to a prime mover or the like and for a co-axial driven shaft 11 likewise extending to an external load.

Briefly stated, the illustrated assembly further comprises a central sun wheel 12 fixed to, and supported by, the driven shaft 11; a stationary outer ring member co-axial with the shafts 10 and 11 and, in accordance with the invention, comprising an iris structure 13 and an almost complete circular loop of chain 14; a planet carrier comprising two flanges 15 on the shaft 10; three swing arms 16 pivotally mounted by means of stub axles 17 on one flange 15 and respectively in alignment with three corresponding swing arms 16 similarly mounted on the other flange 15; three rotatably mounted planet wheel shafts 18 extending between corresponding pairs of swing arms 16; three planet wheels 19 respectively fixed to the planet wheel shafts 18 and engaged with the loop of chain 14; joint means 20 defining a passage extending out of the loop at one end of the break therein, through which surplus chain may be drawn from the loop or taken back into the loop and including bridging means maintaining continuity of engagement between the ring member and the planet wheel as it traverses the break in the chain loop; and orbiting drive transmission means 21 mounted on said carrier and connecting the planet wheel 19 to the sun wheel 12.

The chain may be a simple roller chain with sheet metal side links extending from roller pin to roller pin. In that event each planet wheel is in the form of a chain sprocket with teeth adapted to enter the space between adjacent roller pins. However, the illustrated chain 14 is preferred. It is a chain of the type wherein each link comprises a plurality of plates 22 (see FIG. 3) interleaved at their ends with the plates of the adjacent link and joined thereto by a pin 23 piercing the overlapped plate end portions. The edges of the plates 22 are profiled to present a projecting tooth form and the planet wheels 19 are essentially straight cut spur gears meshing therewith.

The outermost plates 22 of each alternate set have outwardly projecting flanges 24 extending along their rear edges.

In other embodiments the chain may be replaced by a pliable belt having tooth formations moulded or cut into one side thererof and flanges corresponding to flanges 24 embedded in and projecting from the body of the belt.

The chain 14 in the loop is supported by an iris structure 13 which serves to keep the loop circular and co-axial with the shafts 10 and 11 while permitting its diameter to be varied. The iris structure 13 comprises a relatively broad, shallow, channel sectioned, outer hoop 25 and a relatively narrower, slightly shallower, channel sectioned, inner hoop 26 nested within the outer hoop 25. The hoops 25 and 26 are coaxial with the shafts 10 and 11. Each hoop has its channel flanges directed radially inwardly and the outer surface of the channel floor of the inner hoop lies against the inner surface of the floor of the outer hoop. The outer hoop 25 may be fixed relative to the gear box case, indeed it may be replaced by a rectangular groove in the cylindrical outer wall of that case. The inner hoop 26, on the other hand, is rotatable to a limited extent relative to the outer hoop about their common axis.

A plurality, in the present instance sixteen, chain guide blocks 27 are supported in a circular array by rigid links 28 extending from the flanges of the hoops 25 and 26 to the respective blocks 27. Each block 27 is supported by four links 28, disposed two on each side of the block. The two links 28 on each side of each block 27 are pivotally connected at one of their ends to the block by a common pivot pin 29, and their other ends are respectively pivotally connected to adjacent flanges of the two hoops, by means of pivot pins 30 parallel to the pivot pins 29 and spaced apart somewhat in the circumferential direction of the hoops 25 and 26. Thus each block 27 is supported from the hoops 25 and 26 at each side by two links 28 which diverge from the block and terminate on different hoops. It follows that if one hoop rotates relative to the other, the angles of divergence between the links 28 of each pair will alter in concert, to alter the radial distance between the blocks 27 and the hoops 25 and 26, and thereby permit or cause the diameter of the array of blocks 27 to alter without destroying its circularity or concentricity relative to the shafts 10 and 11.

Each guide block 27 has a broad stemmed T-sectioned slot formed in its radially inner face. Each said slot is open ended and extends in the circumferential direction of the array. The said slots are sized to accommodate the projecting flanges 24 of the chain 14 and thus, taken together, form a circular guide for a loop of the chain, a guide which leaves the radially inner parts of the chain loop exposed for engagement with the teeth of..the sprocket type planet wheels 19.

Relative rotation of the hoops to change the chain loop diameter may be effected by any appropriate means. Typically, in an automatic transmission a ratio shift servo motor responsive to signals from system condition sensors may rotate a pinion engaging a rack formation on one of the hoops. If desired the drive to one hoop may be linked to a similar drive to the other to produce contra-rotation of the two hoops. On the other hand, and preferably, one or other or both of the hoops may be free to rotate (as in the embodiment now being described) and the change in loop diameter effected by hauling on or releasing a tail end of the chain extending from the loop, as will be described in detail below. In this event, however, the two hoops are resiliently loaded so that there is a tendency for them to rotate relative to each other in the direction which would expand the diameter of the loop. The loading is such as to maintain a tension in the loop in excess of that induced in it by reaction to the forces imposed on it by the planet wheel when in operation.

In another somewhat similar embodiment the hoops 25 and 26 are replaced by two co-axial hoops of different diameters lying in the same plane. In this instance each guide block is supported by only two parallel rigid links pivoted at one end to the guide block, engaged intermediate their ends to the smaller hoop and engaged at their other ends with the larger hoop; the engagement with the hoops being pivotal in one instance and radially slidable in the other.

Indeed, in all of the preferred embodiments the iris structure is biassed to tension the tensile member as aforesaid.

However it may be caused, as the iris structure contracts the length of Chain in the loop becomes shorter and the angularity between the flanges 24 of adjacent links increases. On the other hand the angularity of the slots receiving the chain flanges in the guide blocks 27 remains constant. Therefore the width of the heads of the slots has to be somewhat more than the thickness of the flanges 24. At some positions in some embodiments this may result in undesirable play in the location of the chain 14, and in other embodiments the flat flanges 24 are replaced by cylindrical studs or bosses presenting the same diametral width to the guide block grooves at all times.

As the loop size changes, or so as to change it, chain must be added to it or subtracted from it, and the joint means 20 are provided to effect this. Those joint means comprise a joint body 31 which in effect replaces a guide block 27 in what would otherwise be a complete circular array of guide blocks. The joint body 31 is supported by four struts 28 from the hoops 25 and 26 in exactly the same way as each guide block is. One end link 32 of the chain 14 may be secured by a through pin or other fastener (not shown) to the joint body 31. The other end of the chain 14 extends as a tail from the loop through a passage 33 for the tail of the chain defined by the joint body 31.

The joint body 31 also defines a slideway 34 for a spring loaded pusher element 35. That pusher element comprises a thrust plate 36, bearing bosses 37 and a cantilever 38. The pusher element is loaded towards a rest or inoperative position at one end of the slideway 33 by a loading spring 39 but may be hauled along the slideway from that position by a cable 40 connected to the cantilever 38 by a relief spring 41 able to overcome the effect of the loading spring 39.

The illustrated joint means also comprise a locking pawl 42 pivoted to the body by a pivot pint 43 and urged into engagement with the chain 14 within the passage 33 by a pawl loading spring 44. The end of the pawl 42 engaging the chain 14 may be lifted away from the chain by the tensioning of a cable 45 connected to the pawl 42 by a clevis 46 secured to the anchorage pin for the spring 44.

When a ratio change, of the kind which requires the diameter of the chain loop to be reduced, is to be effected, tension is applied to the cable 40. This moves the pusher element 35 from its rest position (as shown in full line in FIG. 3) to the broken line position nearest to the rest position in that figure, whereupon the pusher element tilts about its bearing bosses 37 as the thrust plate 36 moves through an opening for that purpose in the floor of the slideway 24 into engagement with the chain 14. Continued movement of the cable 40 causes the spring 41 to stretch. At this time the cable 45 is tensioned to lift the pawl 42 clear of the chain, and the pusher element under the combined loading of the cable 40 and spring 41 moves to the second broken line position shown in FIG. 3. In so doing the pusher element shifts the chain along the passage 33 by one link. The shift of the pusher element by the precise amount needed may be determined by the length of those side parts of the slideway 34 in which the bosses 37 reside. The cable 45 is then relaxed and the pawl 42 moves to hold the chain in its new position.

When a ratio change requiring the diameter of the chain loop to be increased is needed, it is merely necessary to tension the cable 45 momentarily to lift the pawl 42 away from the chain and allow it to return forthwith to re-engage the chain.

The cables 40 and 45 may be tensioned as aforesaid by any appropriate control means. For example they may be connected to rocker type cam followers riding against timing cams on the input shaft 10 and furnished with slidable fulcrum pivots. Thus the follower may be rendered ineffective by bringing its pivot into register with the cable or enabled by moving its pivot away from that position. Alternatively they may be operated by solenoids able to be switched on and off as needed. Furthermore it will be appreciated that many other escapement mechanisms may be used to feed the chain in and out by one link at a time or a predetermined plurality of links at a time, and the invention is not limited to any particular mode of achieving that result.

The joint means 20 also include two bridging pieces 47 extending across the inlet opening of the passage 33 at each side thereof. Each bridging piece may be a rigid arcuate rack secured to, or integral with, the joint body 31, with radially inwardly directed teeth corresponding to those of the chain. The planet wheels 19 are of sufficient axial length for the end margins of each to engage the bridging pieces 47, to maintain continuity of engagement with the ring member as the planet wheels roll across the break in the chain loop.

For preference the radius of curvature of the bridging pieces 47 is the average of the greatest and least diameters that may be adopted by the chain loop. In other embodiments, wherein the diameter change of the chain loop is considerable, each bridging piece 47 may be replaced by a short length of additional chain anchored at one end to the joint body 31 and supported by several of the guide blocks supporting the main chain at the location of the break, which guide blocks are widened at that location and additionally grooved for the purpose.

When the transmission is idle or running at low speeds it is preferable for the planet wheels 19 to be urged into engagement with the chain loop. To that end the swing arms 16 may be individually spring loaded or counterweighted, but for preference each is furnished with a part circular, toothed base part 48 engaged with toothed end flanges 49 on a spool 50 sleeved on the shaft 10. The spool 50 is acted on by loading means tending to rotate it on the shaft 10 as an axle, for example a spiral spring 51 with its inner end anchored to the shaft 10 and its outer end anchored to the spool flange 49. It will be apparent that the loading on the spool will, in turn, lead the swing arms 16 in the direction needed to maintain the planet wheels 19 in contact with the chain 14.

Three transfer shafts 52 are respectively associated with the three planet wheels 19. Each extends coaxially through the bearing boss 17 of the swing arm 16 associated with its planet wheel 19 at the sun wheel end of the assembly. That boss is free to rotate in the relevant flange 15 and the transfer shaft is free to rotate relative to the boss.

A first transfer gear 53 is fixedly mounted on each planet wheel shaft 18 in engagement with a similar second transfer gear 54 fixedly mounted on the corresponding transfer shaft 52. All of the planet wheels 19 and the transfer gears 53 and 54 have the same effective diameters.

A slave wheel 55, again with the same diameter as the planet wheels is fixedly mounted on each of projecting cantilever portions of the transfer shafts 52, and engages the sun wheel 12.

Thus the transfer gear train causes the slave wheels to replicate the orbital motion and self rotation about their own axes of the planet wheels, notwithstanding the variation in the orbit diameter. That is to say, at any transmission ratio, the slave wheels act on the sun wheel in exactly the same way as the planet wheels would in a conventional epicyclic gear box.

In other embodiments the transfer gears and/or the slave gears may differ in diameter from the planet wheels, so that a fixed or permanent ratio change is superimposed, by the drive transfer means, on the variable ratio. Furthermore a plurality of transfer gears may be provided with means to select between them, so as to provide a plurality of ratio ranges, for example a high and a low range, each subject to variation within the range by variation of the loop diameter. For example, additional slave wheels of differing diameters may be fixedly mounted on the cantilever portions of the transfer shafts. Those additional slave wheels may engage additional sun wheels (again of differing diameters) either directly or via lay slave wheels mounted on lay shafts extending from the planet carrier. In these embodiments the selection of the transfer means ratio may be achieved by suitable clutching means whereby a selected one or other of the sun wheels may be made fast to the output shaft.

Figure 5:
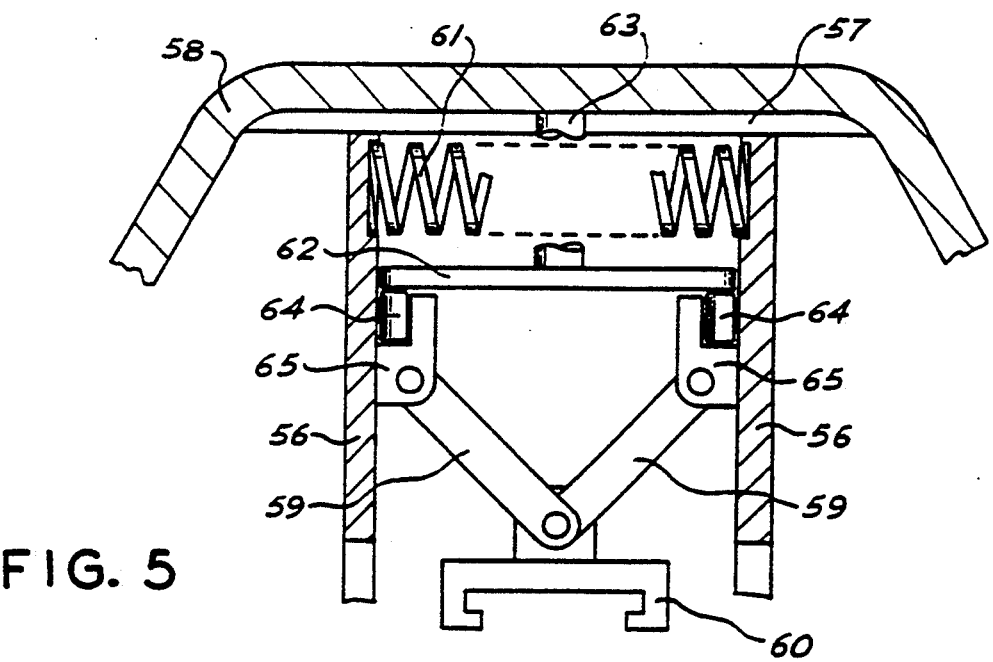
FIGS. 5, 6 and 7 are sectional views taken on a diametral plane of various other forms of iris structure able to be used in transmissions according to the invention, only one intersection of the annular structure being shown.

FIG. 5 illustrates an alternative iris structure. Two support rings 56, each in the form of a large flat washer, have regularly gapped peripheries engaging spline ribs 57 on the inner surface of a cylindrical case 58. Thus the rings 56 may slide laterally to vary the distance between them. Support links 59 are respectively pivoted at one end to the rings 56 and at their other ends to a guide block 60 being one of a circular array of guide blocks functioning in exactly the same way as the guide blocks 27 of the FIG. 1 embodiment. It will be apparent that as the rings 56 separate or come together the diameter of the guide block array will be altered.

The rings 56 may be biased apart by loading springs 61.

The center plane of the guide block array is held fixed by a plurality of equiangularly spaced ties 62. Those ties may rotate on or with spindles 63 and am provided with end rollers 64 engaged with short lengths of channel rails 65 on the rings 56. Although not able to be seen in FIG. 5, the ties 62 are skewed with reference to the axis of the rings 56 so that each may rotate on its spindle as the rings move towards or away from each other.

Figure 6:
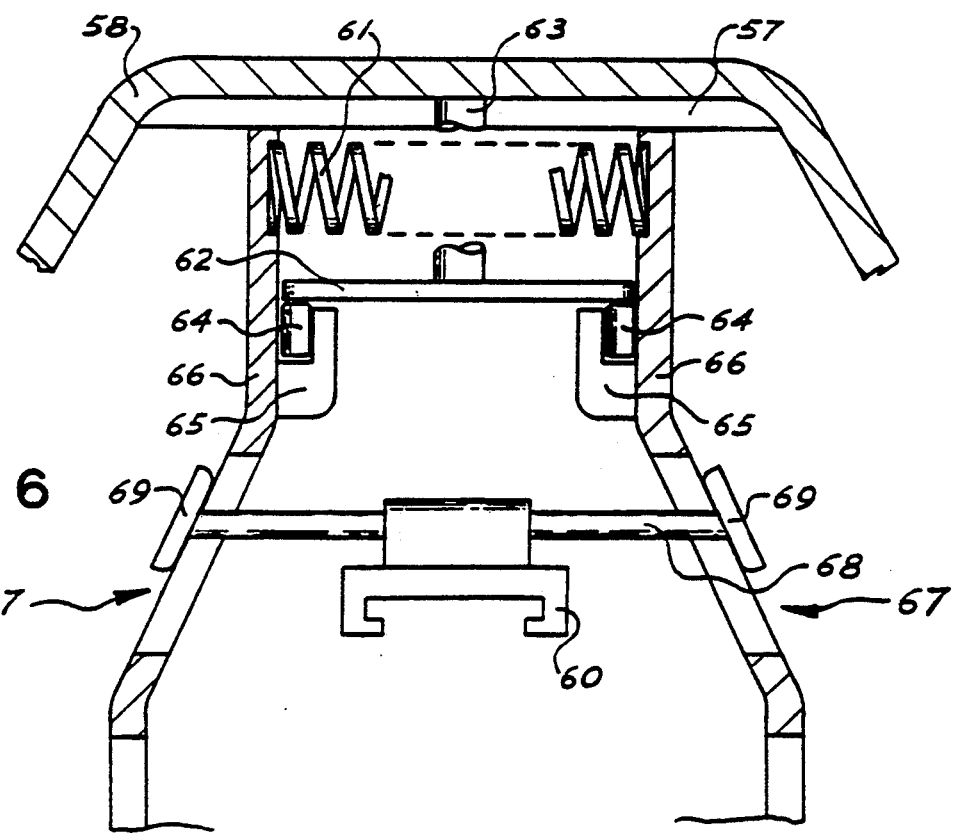

The further example of an iris structure illustrated by FIG. 6 is basically similar to the FIG. 5 embodiment and parts functioning in the same way are similarly referenced but not otherwise described. The only difference is that the rings 66 have conical zones 67 and the guide blocks 60 are supported by beams 78 extending through radially extending slots in those zones. The beams 68 terminate in shoes 69 adapted to ride against the outer surface of the rings so as to move radially as the rings come together or move apart.

Figure 7:
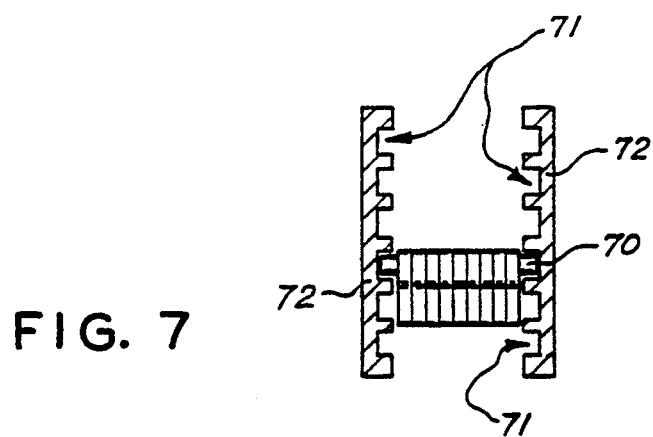
Figure 8:
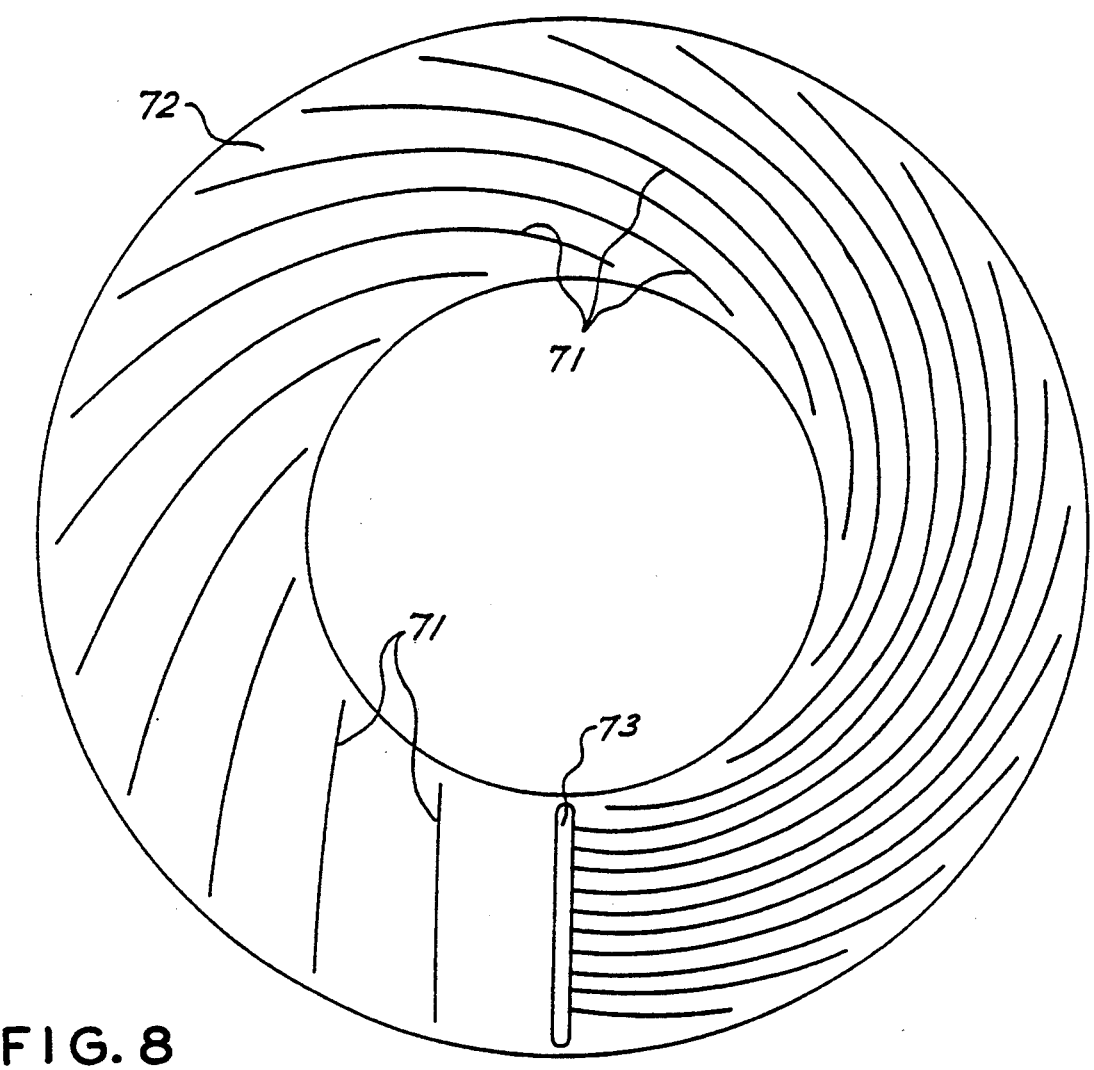
FIG. 8 is a view of the entire annular structure of FIG. 7 taken as on an extended line 8 in that figure.

FIGS. 7 and 8 show a somewhat different iris structure. In this instance the chain pins 70 are extended and engage in curved grooves 71 formed in the confronting faces of two support rings 72. The rings 72 are again like large flat washers, but in this instance are fixed relative to the gear box case. The shapes of the respective grooves 71 reflect the fact that as chain is drawn from the loop the circumferential movement of the links decreases as the link approaches the anchored end of the chain. The radial slot 73 is the slot in which the joint means are mounted, enabling those means to move in and out with changes in the chain loop diameter.

In another embodiment (not illustrated) the iris structure may comprise a circular array of guide blocks, wherein each block is pivotally mounted on the inner end of a radially extending column. The columns are radially movable, that is to say each column is movable longitudinally of itself, by, for example axial output servos respectively associated with the columns. The column movement is controlled to maintain the circularity of the guide block array. Alternatively each column may be threaded and provided with a nut. The column may be held against rotation and the nut against radial movement. The nuts may be engaged by a ring gear, so that rotation of the ring gear by a single servo effects concerted rotation of the nuts and concerted axial movement of the columns.

The essential components and novel features of transmissions germane to the invention have been described above and it will be appreciated that in practice the transmissions may be provided with other items or systems conventionally provided in drive transmissions, as may be needed to suit any particular application.

What is claimed is:

1. A variable ratio epicyclic drive transmission, of the kind having a fixed central axis and comprising a rotatable driving element (10) with said fixed axis as its axis of rotation, a rotatable driven element (11) also with said fixed axis as its axis of rotation, a central sun wheel (12) fixed relative to one of said elements so as to rotate in concert with said one element also with said fixed axis as its axis of rotation, a stationary outer ring member co-axial with said elements, a planet carrier (15) fixed relative to the other of said elements so as to rotate in concert with said other element with said fixed axis as its axis of rotation and defining an orbiting axis of rotation parallel to and radially spaced from said fixed axis, and at least one planet wheel (19) mounted on said carrier (15) for rotation about its own axis and for orbital movement in engagement with said ring member, said transmission being characterised;

in that the ring member comprises an almost complete, but broken, substantially circular loop of a pliable positive drive tensile member (14) engagable by said planet wheel and supported by a contractile iris structure (13) permitting the diameter of the loop to be varied while maintaining its circularity;

in that said iris structure includes joint means (20) comprising a tail guide defining a passage (33) extending out of the loop at one end of the break therein, through which said tensile member may be drawn from the loop or taken back into the loop, and bridging means (47) maintaining continuity of engagement between the ring member and the planet wheel (19) as it traverses the break in the loop;

in that the planet wheel (19) is swing mounted on the planet carrier (15);

and in that orbiting drive transfer means (53,54,55) mounted on said carrier (15) connect the planet wheel (19) to the sun wheel (12).

2. A transmission according to claim 1 further characterised in that said iris structure (13) comprises a part circular array of guide blocks (27) slidably engagable by said tensile member (14) in a manner permitting circumferential movement of the tensile member relative to the array and in that each guide block (27) is supported by at least two pairs of pivotable links (28), wherein the links of each pair extend from said each block respectively to two hoops (25,26) encircling the array, whereby relative rotation of the hoops about their axis alters the diameter of the array.

3. A transmission according to claim 1 further characterised in that said iris structure (FIG. 5) comprises a part circular array of guide blocks (60) slidably engagable by said tensile member (14) in a manner permitting circumferential movement of the tensile member relative to the array and in that each guide block is supported by at least one pair of pivotable links (57), wherein the links of that pair extend from said each block respectively to two: coaxial, spaced apart, annular support plates (56), whereby variation in the spacing between the support plates causes variation in the diameter of the array.

4. A transmission according to claim 1 further characterised in that said iris structure comprises two, parallel, stationary, coaxial, annular side plates (72) having a plurality of curved tracks (71) formed in their confronting surfaces, in that equally spaced apart lateral projections on said tensile member respectively engage those tracks, and in that the tracks are shaped such that when tensile member is drawn from the loop and the tensile member projections move along the tracks, tho loop of tensile member remaining in engagement with the tracks becomes reduced in diameter but retains its circularity.

5. A transmission according to claim 1 further characterised in that said joint means comprises an escapement mechanism (35,42) such that tensile member is drawn from or fed into the loop by one or more pitch lengths of positive drive formations thereof.

6. A transmission according to claim 1 further characterised in that loading means (50,51) resiliently urge said planet wheel into engagement with said tensile member loop.

7. A transmission according to claim 6 wherein said loading means comprise a spool (50) sleeved upon an input shaft (10) fixed to said carrier (15), said spool including peripherally toothed end flanges (49) engaged with toothed base portions (48) of swing arms (16) supporting said planet wheel (19) from said carrier (15), and means (51) urging said spool to rotate on said input shaft.

8. A transmission according to claim 1 further characterised in that said drive transfer means comprise a first transfer gear (53) fixed relative to and coaxial with said planet wheel (19), a second transfer gear (54) mounted for rotation about the swing mounting axis of said planet wheel (19) in engagement with the first transfer gear (53) and a slave gear (55) fixed relative to and coaxial with said second transfer gear (54) in engagement with said sun wheel (12).

* * * * *